Oct. 17, 1950     C. E. NELSON     2,526,392
AERIAL CABLE CUTOUT HOUSING
Filed Sept. 16, 1948     2 Sheets-Sheet 1
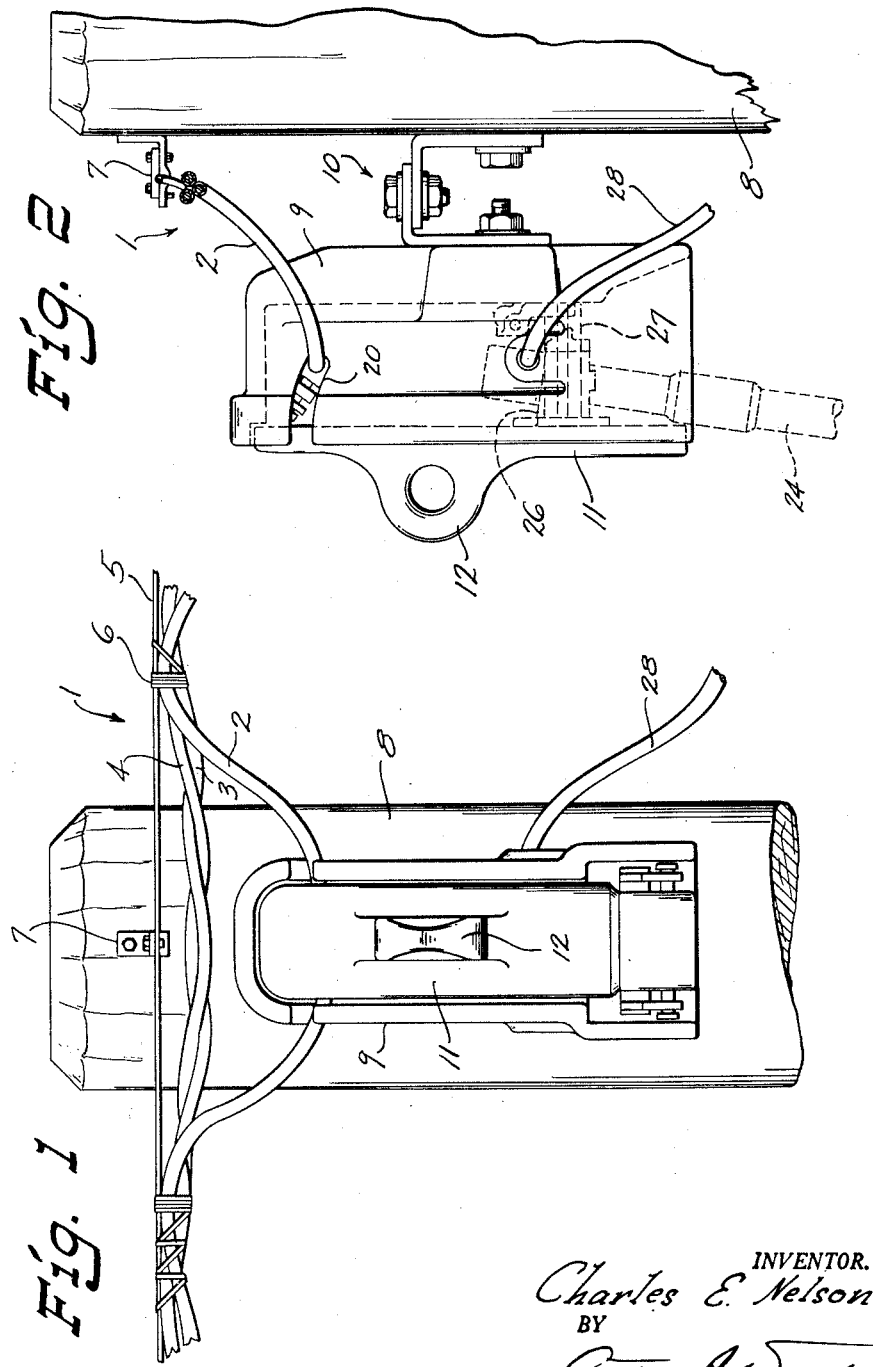
INVENTOR.
Charles E. Nelson
BY
Arthur R. Woolford
Attorney Oct. 17, 1950        C. E. NELSON        2,526,392
AERIAL CABLE CUTOUT HOUSING
Filed Sept. 16, 1948        2 Sheets—Sheet 2
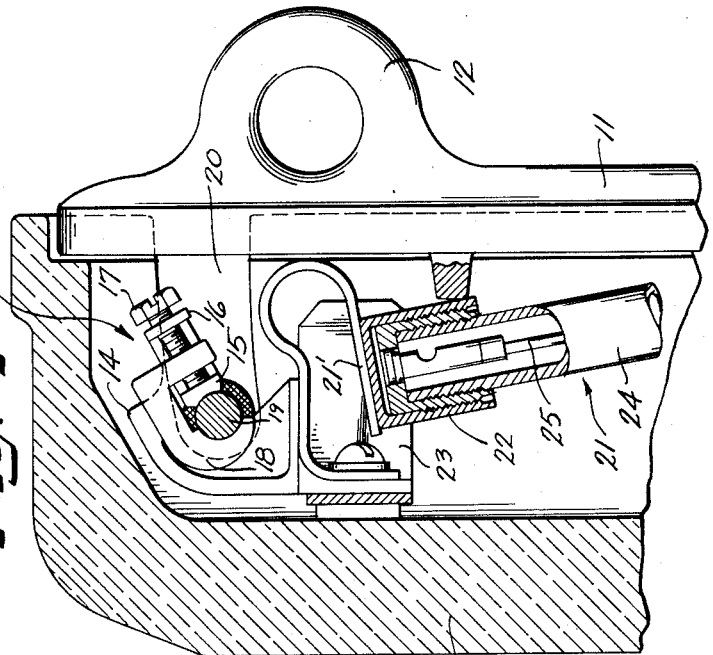
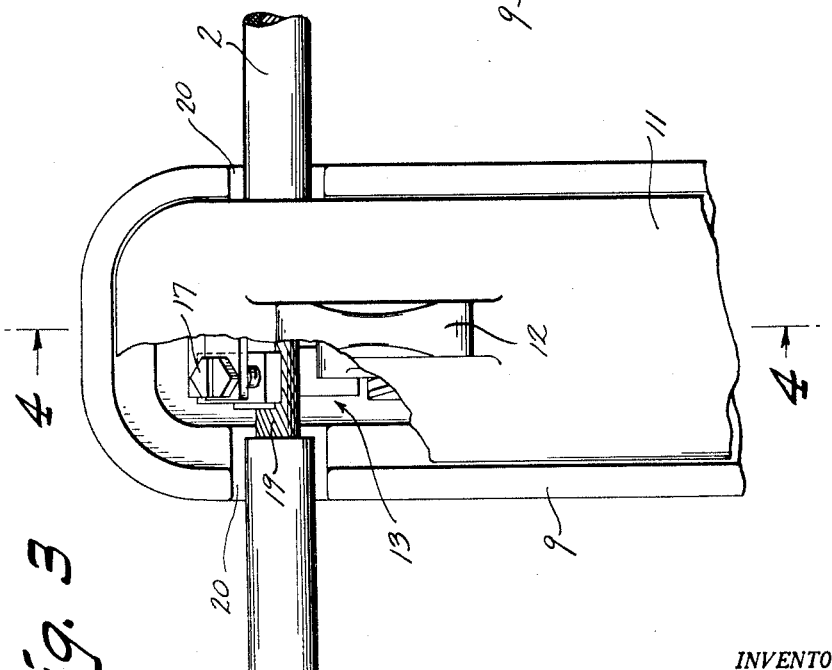
INVENTOR.
Charles E. Nelson
BY
Archer R. Woolfolk
Attorney Patented Oct. 17, 1950

2,526,392

UNITED STATES PATENT OFFICE 2,526,392

AERIAL CABLE CUTOUT HOUSING

Charles E. Nelson, Jenkintown, Pa., assignor to McGraw Electric Company, a corporation of Delaware Application September 16, 1948, Serial No. 49,544

1 Claim. (Cl. 174—52)

This invention relates to cutouts and is particularly directed to a cutout construction for an aerial cable.

The present trend in electrical distribution is towards the use of what is called an aerial cable in which one or more cables are bound together by metal tapes or other means and are supported from a messenger wire so that these cables may be passed through trees without danger and also so that they will occupy a smaller amount of room on the supporting poles. In addition to this, there are, of course, many other advantages which do not concern the present invention. However, it is desirable at times to tap a single cable and to install a cut-out for that cable. Heretofore it has been necessary to use a considerable amount of additional equipment in order to accomplish the above.

This invention is designed to provide a cutout construction which is particularly suited for use with an aerial cable and which is so made that it is not necessary to cut the cable at all but merely requires the stripping of a small portion of the insulation from the cable and the clamping of the exposed portion of the cable directly to one of the terminals of the cutout structure, the stripped portion being fully housed and protected from the weather.

In greater detail, a further object is to provide a cutout construction which is so made that a portion of the cable may readily be inserted through slots in the housing of the cutout and may be clamped in position out of the way of any of the working parts of the cutout.

Further objects are to provide an aerial cable cutout which is of simple construction, which is very easy to install, and which provides access not only to the cutout itself but also to the clamping means for the stripped portion of the cable.

An embodiment of the invention is shown in the accompanying drawings, in which:

Figure 1 is an elevation showing a fragment of the pole and showing the device attached to the pole and to one of the conductors of an aerial cable.

Figure 2 is a side elevation of the structure shown in Figure 1.

Figure 3 is an enlarged front view of the top portion of the structure shown in Figure 1 with parts broken away.

Figure 4 is a sectional view on the line 4—4 of Figure 3.

Referring to the drawings, it will be seen that an aerial cable has been indicated generally by the reference character 1 and may comprise either a single conductor or a plurality of conductors 2, 3, and 4 as indicated. These conductors are bound together in any suitable manner and to a messenger cable 5 by means of metal binding tapes or members 6.

In using the device one of the cables is unwound, for instance, the cable 2 and is looped downwardly. The messenger cable 5 is held by means of a bracket 7 to a pole or other suitable support 8.

The cutout comprises a housing 9 of porcelain or other suitable material which is secured to the pole 8 or other support by means of a bracket 10 or in any other suitable manner. The housing is provided with a door 11 of insulating material which is removably hinged to the housing in any suitable manner, for example, as disclosed in the United States Patent to William O. Schultz, No. Re. 22,372 of September 7, 1943, for a Fuse. The door 11 may be provided with a manipulating eyelet 12 which may receive a switch stick so that the door may be opened or closed as desired.

The housing is provided with an upper terminal assembly indicated generally by the reference character 13, see Figures 3 and 4. This upper terminal assembly includes an upper portion 14 which is provided with a cable contacting portion 15 and with apertured guiding ears 16 which loosely receive screws 17. These screws are threaded through C-clamps 18 and serve to clamp the bared portion 19 of the cable to the cable contacting portion 15.

In using the device the cable 2 has a portion bared as indicated at 19 in Figures 3 and 4 and as previously mentioned hereinabove. The bared portion and the adjacent portion of the cable 2 are arranged to be positioned within the housing 9 without cutting or interrupting the cable. This is accomplished by providing the side walls of the housing with a pair of inwardly and perhaps slightly downwardly directed slots 20 within which the bared portion 19 and the adjacent portions of the cable 2 are positioned by merely slipping the cable into place from the open front of the housing.

During this operation the door 11 remains open and provides access to the fastening means for clamping the cable in place.

It is to be noted that the upper terminal assembly indicated generally at 13 comprises, in addition to the portion hereinabove described, any suitable contacting portion, for example, the spring 21' which is adapted to engage the top portion of the cap 22 of a drop-out fuse assembly indicated generally at 21. The upper terminal assembly also includes a pair of spring ears 23 between which the terminal or cap 22 of the drop-out fuse assembly is positioned.

The drop-out fuse tube may comprise a fiber tube 24 within which a fuse link 25 is positioned. This fuse tube is normally held in its uppermost position by means of the fuse link and is adapted to drop or slide downwardly to the dotted line position shown in Figure 2 when the fuse link is ruptured. The specific mechanism for accomplishing these functions is not shown but may be the same as that shown in the above noted patent to William O. Schultz. The fuse tube 24 is slidably supported from the door by means of a metal sleeve indicated in dotted lines at 26 in Figure 2, which metal sleeve is attached to the door. The lower stationary terminal is indicated generally by the reference character 27 and is adapted to receive the load conductor 28, the cable or conductor 2 being the line conductor.

The lower portion of the housing is open as shown in dotted lines in Figure 2 and as set forth in the above noted patent to William O. Schultz.

It is obvious that after the fuse link has been ruptured on overload, that a visual indication is given by the projecting portion of the fuse tube assembly as shown in dotted lines in Figure 2.

Under these conditions, it is a simple matter for a lineman to renew the fuse by opening the door 11 and replacing the fuse link or else by substituting for the door and fuse tube assembly a new door and fuse tube assembly which may already be prepared and may be carried by the lineman.

It is obvious that if desired the cable may be bared for the entire width of the cutout housing and in this event the slots in the side walls would be made narrower. Obviously the cable could be taped in either instance adjacent the points where it passes through the side walls of the housing.

It will be seen that a novel cutout construction has been provided for an aerial cable which is so made that it is not necessary to cut the cable at all but instead in which all that is necessary is to remove a small portion of the insulation of the cable and to insert the cable into slots in the side walls of the housing of the cutout. Thereafter the cable is clamped to the upper terminal assembly and the device is ready for operation.

While it is primarily intended that this cutout shall be used for high voltage or primary cables, nevertheless, it is obviously possible to use this cutout with low voltage or secondary cables if desired. Also while it is primarily intended that this cutout shall be attached to a pole or other suitable supporting means, it is nevertheless within the province of this invention to support the cutout directly on the cable at least for a temporary installation.

It is to be noted particularly that this invention provides a unitary construction which allows the use of an unbroken line conductor and yet allows the user to selectively connect or disconnect this unbroken line conductor with a load conductor, and at the same time provides a unitary construction whereby these functions are accomplished with a single piece of apparatus.

While the device has been illustrated and described as used for a single phase tap on a three phase cable, it is clear that three devices could be employed if three phase service is wished for the branch line. Also it is clear that the device could be used for a single cable as well as a tap on a three phase cable.

Although this invention has been described in considerable detail, it is to be understood that such description is intended as illustrative rather than limiting, as the invention may be variously embodied and is to be interpreted as claimed.

I claim:

A housing construction for an electrical device arranged to normally electrically connect to an unbroken line conductor comprising an insulating housing having an open front and slotted sides with the slots extending inwardly from the front edges of the sides to allow passage of the unbroken line conductor inwardly of the housing, an upper stationary terminal having fastening means accessible from the open front of said housing for electrically connecting the unbroken line conductor to the upper stationary terminal, and a single door hinged to said housing for closing the entire front of said housing.

CHARLES E. NELSON.

REFERENCES CITED

The following references are of record in the file of this patent:

UNITED STATES PATENTS

| Number | Name | Date |
| --- | --- | --- |
| Re. 22,372 | Schultz | Sept. 7, 1943 |
| 2,114,745 | McCluskey | Apr. 19, 1938 |
| 2,281,515 | Ruggieri | Apr. 28, 1942 |
| 2,457,925 | Salmons et al. | Jan. 4, 1949 |